United States Patent [19]

Uchikoshi et al.

[11] Patent Number: 5,085,379
[45] Date of Patent: Feb. 4, 1992

[54] METHOD OF CONTROLLING REEL DRIVE

[75] Inventors: Gohji Uchikoshi, Higashimusayama; Keiji Sano, Futyu, both of Japan

[73] Assignee: Nakamichi Corporation, Kodaira, Japan

[21] Appl. No.: 518,128

[22] Filed: May 3, 1990

[30] Foreign Application Priority Data

May 10, 1989 [JP] Japan .................................. 1-116848

[51] Int. Cl.$^5$ ............................................ G11B 15/32
[52] U.S. Cl. ....................................... 242/186; 318/7; 360/73.14
[58] Field of Search ....................... 242/186; 318/7, 6; 360/73.14

[56] References Cited

U.S. PATENT DOCUMENTS

| | | | |
|---|---|---|---|
| 3,764,087 | 10/1973 | Paananen et al. | 242/186 |
| 3,984,868 | 10/1976 | Ragle et al. | 242/186 |
| 4,015,799 | 4/1977 | Koski et al. | 318/7 |
| 4,095,146 | 6/1978 | Sparman et al. | 318/7 |
| 4,497,459 | 2/1985 | Yoshino et al. | 242/186 |
| 4,620,241 | 10/1986 | Ono | 360/73.14 |
| 4,739,950 | 4/1988 | Goker et al. | 360/73.14 |
| 4,817,887 | 4/1989 | Harigaya et al. | 242/186 |

OTHER PUBLICATIONS

IBM Technical Disclosure Bulletin, vol. 14, No. 6, 11/1971.

Primary Examiner—Daniel P. Stodola
Assistant Examiner—John Q. Nguyen
Attorney, Agent, or Firm—Pearne, Gordon, McCoy & Granger

[57] ABSTRACT

A method of controlling reel drive so that a magnetic tape is transported from one reel of first and second reels to the other between them at predetermined transport velocity including the steps of forming a control signal obtained by operationally determining predetermined expressions having functions of the rotational numbers of the two reels, indicating a variation in the turn numbers of the magnetic tape on the reels and of the winding radii of the reels and controlling at least one of the reels based on a comparison of the control signal with informations of rotational angular velocity of the one reel actually detected.

11 Claims, 6 Drawing Sheets

METHOD OF CONTROLLING REEL DRIVE

BACKGROUND OF THE INVENTION

A magnetic recording and reproducing apparatus comprises means to transport a magnetic tape. There has been used reel drive means for transporting the magnetic tape at constant velocity by directly controlling rotation of reels without any capstan and pressure roller.

In such reel drive means, there is a variable winding diameter with which the magnetic tape is wound on a winding reel and a variable winding diameter with which the magnetic tape is supplied from a supply reel as the magnetic tape is transported. Thus, rotational speeds of the reels are required to be controlled in accordance with the winding diameter of the magnetic tape thereon.

Figure 6:
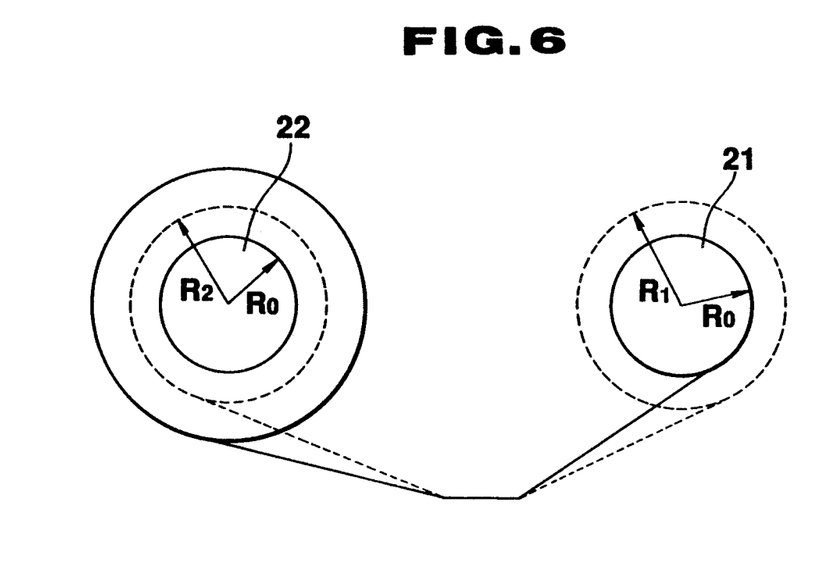
FIG. 6 briefly illustrates a method of controlling reel drive in accordance with a prior art.

A conventional method of controlling the rotational speeds of the reels will be described with reference to FIG. 6.

A magnetic tape is transported from a supply reel 22 to a winding reel 21. Supposing that a winding radius of the winding reel 21, when the magnetic tape begins to be transported, is Ro, a desired transport velocity of the magnetic tape is V, and the time lapsing after the magnetic tape begins to be transported is t, a rotational angular velocity $\omega_1$ of the winding reel 21 after time t lapses is determined by the following expression;

$$\omega_1 = V/\sqrt{Ro^2 + (t \cdot V \cdot d/\pi)}$$

Accordingly, if the rotation of the reels is so controlled that the actually detected rotational angular velocity $\omega r_1$ of the winding reel 21 is coincident with the rotational angular velocity $\omega_1$ operationally determined by the aforementioned expression, then the actual tape transport velocity Vr can be the desired value of velocity V.

However, since the conventional method controls the rotation of the reels based on an operational form of time t from the time when the tape begins to be transported, it is very difficult to manage the time t. For example, once a difference between the the rotational speed $\omega_1$ by the operation and the actual rotational speed $\omega r_1$ occurs, it is accumulated, which disadvantageously appears at the rotational speed $\omega_1$ by the operation.

SUMMARY OF THE INVENTION

Accordingly, it is a principal object of the invention to provide a method of controlling reel drive for a magnetic recording and reproducing apparatus adapted to transfer a magnetic tape at predetermined transport velocity.

It is another object of the invention to provide a method of controlling a reel drive for a magnetic recording and reproducing apparatus adapted to maintain an allowable range of adverse effect on an error of rotational position occurring in winding back a magnetic tape in the course of a reversible winding operation.

It is a further object of the invention to provide a method of controlling a reel drive adapted to drive reels in a stable manner because of no need of informations of time and tape thickness.

In accordance with one aspect of the present invention, there is provided a method of controlling reel drive so that a magnetic tape is transported from one reel of first and second reels to the other between them at predetermined transport velocity in which;

if a ratio, $C_2/C_1$, of a second rotational number $C_2$, indicating variation in a turn number on said second reel after said magnetic tape begins to be transported, to a first rotational number $C_1$, indicating variation in a turn number on said first reel after said magnetic tape begins to be transported, is set to be $\alpha$ and if a ration, $R_s/R_o$, of a winding radius of said second reel to that of said first reel is set to be $\beta$ at the point when said magnetic tape begins to be transported;

forming a control signal based on operation of an expression (1) of a winding radius $R_1$ of said first reel after said magnetic tape begins to be transported;

$$R_1/R_o = (\alpha^2 + 2\alpha\beta - 1)/(\alpha^2 + 1) \quad (1)$$

and/or an expression (2) of a winding radius $R_2$ of said second reel after said magnetic tape begins to be transferred;

$$R_2/R_o = (2\alpha + \beta - \alpha^2\beta)/(\alpha^2 + 1) \quad (2)$$

and comparing said control signal with a rotational angular velocity information of said first and/or second reels actually detected whereby a rotation of at least one of said first and second reels is controlled.

Since the winding radii of the reels can be known from the rotational number of the reels, the rotational angular velocity that the reels should have for obtaining the predetermined transport velocity of the magnetic tape can be operationally determined on the winding radius informations.

In accordance with another aspect of the present invention, there is provided a method of controlling reel drive so that a magnetic tape is transported from one reel of first and second reels to the other between them at a predetermined transport velocity in which;

if a ratio, $C_2/C_1$ of, second rotational number $C_2$, indicating variation in a turn number on said second reel after said magnetic tape begins to be transported, to first rotational number $C_1$, indicating variation in a turn number on said first reel after said magnetic tape begins to be transported, is set to be $\alpha$ and if a ratio of $R_s/R_o$ of a winding radius of said second reel to that of said first reel is set to be $\beta$ when said magnetic tape begins to be transported;

forming a control signal based on operation of an expression (1) of a winding radius $R_1$ of said first reel after said magnetic tape begins to be transported;

$$R_1/R_o = (\alpha^2 + 2\alpha\beta - 1)/(\alpha^2 + 1) \quad (1)$$

and/or an expression (2) of a winding radius $R_2$ of said second reel after said magnetic tape begins to be transported;

$$R_2/R_o = (2\alpha + \beta - \alpha^2\beta)/(\alpha^2 + 1) \quad (2)$$

comparing said control signal with a rotational angular velocity information of said first and/or second reels actually detected whereby a rotation of at least one of said first and second reels is controlled;

memorizing one of said first and second rotational numbers $C_1$ and $C_2$ when the other rotational number reaches a predetermined rotational number in the case of said magnetic tape being transported in a direction in which both of said first and second rotational numbers $C_1$ and $C_2$ increase;

and correcting said ratio $\alpha$ based on said memorized rotational information in the case of said magnetic tape being transported in a direction in which both of said first and second rotational numbers $C_1$ and $C_2$ decrease.

When the rotational numbers $C_1$ and $C_2$ decrease, the rotational position error $C_2$ having an adverse effect on the ratio $\alpha$ can be removed by being corrected.

BRIEF DESCRIPTION OF THE DRAWINGS

The above and other objects and features of the invention will be apparent from the description of the embodiments of the invention with reference to the accompanying drawings in which.

DETAILED DESCRIPTION OF THE EMBODIMENTS

Figure 1:
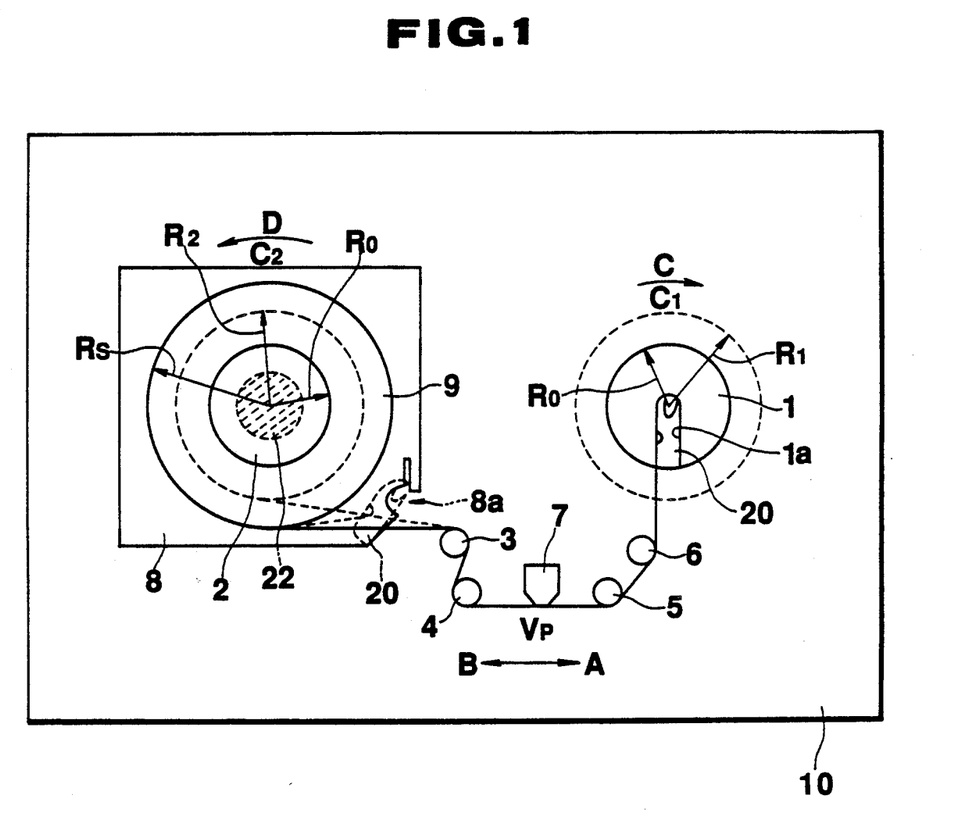
FIG. 1 is a brief plane view of a magnetic tape transport system to which the invention is applied.

Referring now to FIG. 1, there is illustrated a magnetic tape running path along which a magnetic tape 9 runs. A cartridge 8 comprises an inner reel (referred to as C reel herein below) 2 on which the magnetic tape 9 is wound and a leader block 20 holding a leader end of the magnetic tape 9 and removably provided at an opening 8a in the cartridge 8. The cartridge 8 is brought to a position indicated in FIG. 1 by loading means (not shown) in a body 10 of a recording and reproducing apparatus. With the cartridge 8 loaded in the body 10 of the recording and reproducing apparatus, a shaft of the C reel 2 is connected to a shaft of a supply reel 22 so that they rotate together with each other. The leader block 20 is removed from the cartridge 8 by the leader block guide means (not shown) and introduced into a recess 1a in a winding reel 1 of radius $R_o$ provided in the body 10 through the predetermined path so that the leader block 20 rotates together with the winding reel 1. It will be noted from FIG. 1 that the running path of the magnetic tape 9 is controlled by tape guides 3, 4, 5 and 6 so that the magnetic tape 9 is slidably engaged with a magnetic head 7.

A winding radius of the C reel 2 in the initial condition, in which the leader block 20 is brought so as to be introduced into the recess 1a in the winding reel 1, is set to be Rs, and a winding radius of the winding reel 1, which is substantially equal to a radius of the winding reel 1 in the initial condition, is set to be $R_o$. Winding radii of the winding reel 1 and the C reel 2 when the magnetic tape 9 is moved by an arbitrary distance 1, as indicated by dotted lines in FIG. 1, from the initial condition are set to be $R_1$ and $R_2$, respectively. Finally, rotational numbers in a direction in which the winding reel 1 and the C reel 2 rotate until the magnetic tape 9 moves by the distance 1 are set to be $C_1$ and $C_2$, respectively.

The rotational numbers $C_1$ and $C_2$ are zero in the initial condition. As the magnetic tape 9 is transported in a forward direction indicated by an arrow A, the rotational numbers $C_1$ and $C_2$ increase with different increase rates. As the magnetic tape 9 is transported in a reverse direction indicated by an arrow B, the rotational numbers $C_1$ and $C_2$ decrease with different decrease rates.

It will be noted that the winding radii $R_1$ and $R_2$ of the reels can be expressed by a function of $\alpha$ which is a ratio $C_2/C_1$ of the rotational numbers of the reels.

If a thickness of the magnetic tape 9 is set to be d, then the following expressions will be established;

$$C_1 = (R_1 - R_o)/d \quad (1)$$

$$C_2 = (Rs - R_2)/d \quad (2)$$

From the aforementioned expressions (1) and (2) will be obtained the following expression;

$$\alpha = C_2/C_1 = (Rs - R_2)/(R_1 - R_o) \quad (3)$$

If $\beta = Rs/R_o$, $x = R_1/R_o$ and $y = R_2/R_o$ are supposed, the expression (3) can be converted into the following expression;

$$\alpha = (\beta - y)/(x - 1) \quad (4)$$

A winding area on the thickness d of the magnetic tape 9 will be expressed by the following expression;

$$\pi(Rs^2 - R_o^2) = \pi(R_2^2 - R_o^2) + \pi(R_1^2 - R_o^2) \quad (5)$$

The expression (5) can be converted into the following expression by introducing $\beta$, x and y into it.

$$(\beta^2 - 1) = (y^2 - 1) + (x^2 - 1) \quad (6)$$

The expression (4) can be reformed into $x = (\beta - y)/\alpha$ and by introducing it into the expression (6) can be obtained the following expression;

$$(\alpha^2 + 1)y^2 - 2(\alpha + \beta)y + (\beta^2 + 2\alpha\beta - \alpha^2\beta^2) = 0$$

The aforementioned expression can be reformed on y and, the following expression can be obtained;

$$y = (2\alpha + \beta - \alpha^2\beta)/(\alpha^2 + 1) \quad (7)$$

Similarly, the expression (4) can be reformed into $y = \beta - \alpha(x^2 - 1)$ and as this is introduced into the expression (6), the following expression can be obtained;

$$(\alpha^2 + 1)x^2 - 2\alpha(\alpha + \beta)x + (\beta^2 + 2\alpha\beta - 1) = 0$$

The aforementioned expression can be reformed on x and, the following expression can be obtained;

$$x = (\alpha^2 + 2\alpha\beta - 1)/(\alpha^2 + 1) \quad (8)$$

A method of transporting the magnetic tape 9 at constant velocity on the aforementioned operational results in accordance with the invention will be described herein below.

Figure 2:
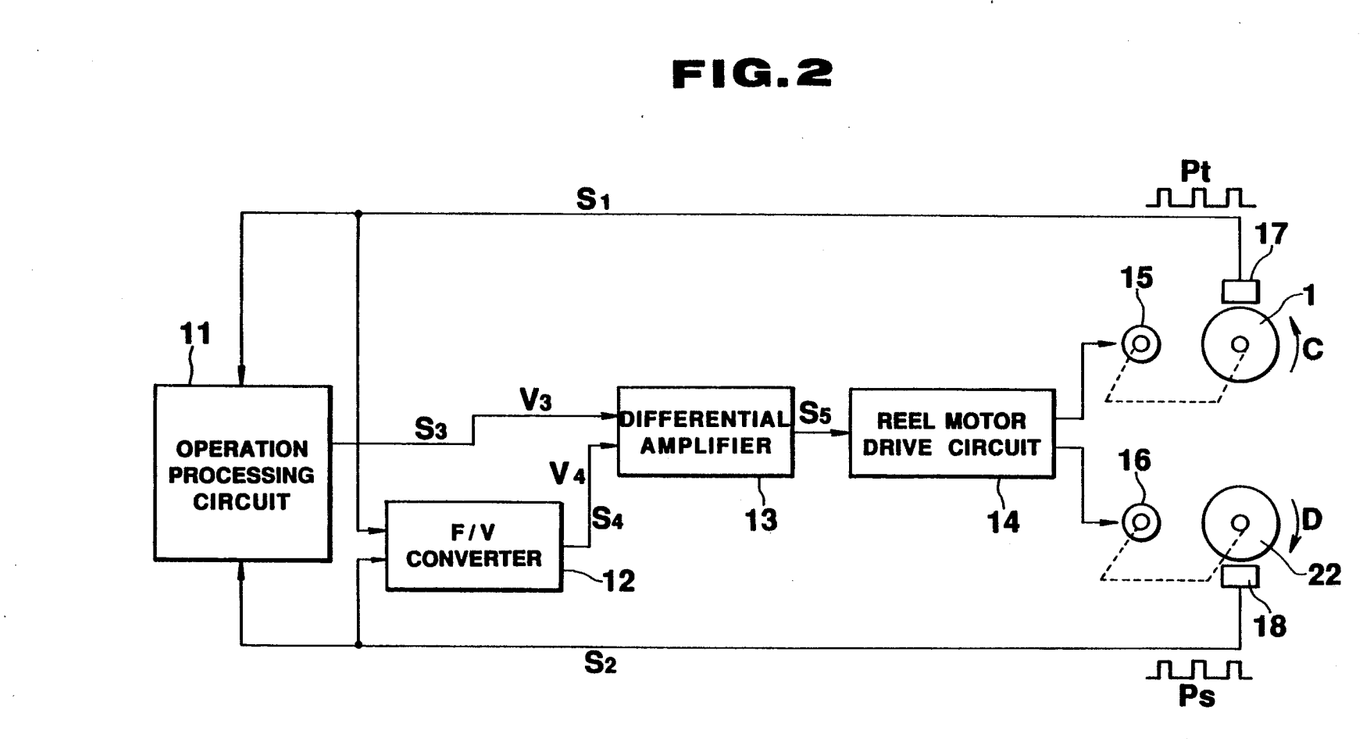
FIG. 2 is a block diagram of a control circuit used for a method of the invention.

FIG. 2 illustrates a control circuit used for the method of the invention. A rotation detector 17 is disposed near the winding reel 1 and serves to generate one pulse every 1/n rotation of the winding reel 1 in association with a detected member (not shown) and as a result generates n pulses $P_t$ during one revolution of the winding reel 1. A rotation detection signal $s_1$ of pulses $P_t$ is supplied to an operation processing circuit 11 and a frequency-to-voltage converter (referred to as F/V converter hereafter) 12. Similarly, a rotation detector 18 serves to detect a rotation of the supply reel 22 to output a rotation detection signal $s_2$ of n pulses $P_s$ per one revolution of the supply reel 22. The rotation detection signal $s_2$ is also supplied to the operation processing circuit 11 and the F/V converter 12. Rotational directions C and D of the reels 1 and 22 in FIG. 2 correspond to rotational directions C and D of those in FIG. 1.

The operation processing circuit 11 includes two counters counting the detected pulses $P_t$ and $P_s$ of the rotation detection signals $s_1$ and $s_2$ and serve to monitor the rotational directions of the reels whereby the counters count up when the reels rotate in the directions of C and D, respectively while they count down when they rotate in the reverse directions.

Since the counters are reset to be zero in the aforementioned initial condition, a relation between the counted values $P_1$ and $P_2$ of the pulses $P_t$ and $P_s$ and the rotational numbers $C_1$ and $C_2$ of the winding reel 1 and the C reel 2 are expressed as follows;

$$C_1 = P_1/n \text{ and } C_2 = P_2/n$$

The operation processing circuit 11 also serves to determine x and y by its operation of the expressions (7) and (8) based on a turn number ratio or winding ratio $\alpha$ that is a ratio of the counted value $P_2$ to the counted value $P_1$ and to output the control signal $s_3$ on this operational determination.

A constant $\beta$ of the expressions (7) and (8) is determined from $R_s/R_o$. Although the radii $R_o$ of the winding reel 1 and the C reel 2 have a predetermined value, the winding radius $R_s$ of the C reel 2 in the initial condition may have a predetermined value or may be determined as described herein below.

A ratio $\alpha_1$ of the detected pulses when the magnetic tape 9 is transported a predetermined distance from the initial condition until the C reel 2 rotates one revolution, for example, is determined. Since the relation between the ratio $\alpha_1$, $R_o$ and $R_s$ is expressed by $R_s = R_o/\alpha_1$, the value of $R_s$ can be determined by the operational process.

A method of operational determination of the control signal $s_3$ will be described herein below.

If it is supposed that a tape transport velocity at the time when the magnetic tape 9 is transported by arbitrary movement distance 1 is V, then the rotational angular velocities $\omega_1$ and $\omega_2$ of the winding reel 1 and the supply reel 22 are operationally determined by the following expressions;

$$\omega_1 = V/R_1 = V/(x.R_0)$$

$$\omega_2 = V/R_2 = V/(y.R_0)$$

Accordingly, a sum of the aforementioned angular velocities is expressed by the following expression;

$$\omega_1 + \omega_2 = f(\alpha) = (V/R_0)(1/x + 1/y) \quad (9)$$

The rotational angular velocities by operational determination will be referred to as operational angular velocities herein below.

The control signal $s_3$ is output as a voltage signal $V_3$ proportional to the value of $f(\alpha)$ and expressed by $k_1$ f($\alpha$) wherein $k_1$ is a proportional constant. The proportional constant $k_1$ is of positive polarity when the magnetic tape 9 is desired to be transported in the direction of the arrow A of FIG. 1 while it is of negative polarity when the magnetic tape 9 is desired to be transported in the reverse direction.

The F/V converter 12 receives the rotation detection signals $s_1$ and $s_2$ and outputs an angular velocity sum signal $s_4$ proportional to a sum $(\omega p_1 + \omega p_2)$ of rotational angular velocities (referred to as actual angular velocities herein below) $\omega p_1$ and $\omega p_2$ of the reels actually rotating. Thus, the voltage value $V_4$ of the angular velocities $s_4$ is expressed by the following expression;

$$V_4 = k_2(\omega p_1 + \omega p_2)$$

In this expression, the polarity of proportional constant $k_2$ varies depending on the direction in which the magnetic tape 9 runs. In the case that the magnetic tape 9 moves in the direction of the arrow A of FIG. 1 and the reels 1 and 2 rotate in the directions of C and D thereof, respectively, the proportional constant $k_2$ is of positive polarity. In the case that the magnetic tape 9 moves in the reverse directions and the reels 1 and 2 rotate in the reverse directions, the proportional constant $k_2$ is of negative polarity. Absolute values of the constants $k_1$ and $k_2$ are set to be equal to each other.

A differential amplifier 13 receives the control signal $s_3$ and the angular velocity sum signal $s_4$ and outputs a voltage difference signal $s_5$ corresponding to a difference between them. A reel motor drive circuit 14 serves to drive a reel motor 15 having a shaft connected to the shaft of the winding reel 1 and also a reel motor 16 having a shaft connected to the shaft of the supply reel 22 as described herein below. When the polarity of the voltage difference signal $s_5$ is positive, the movement of the magnetic tape 9 is accelerated in the direction of the arrow A of FIG. 1 in accordance with the level thereof. When the polarity of the voltage difference signal $s_5$ is negative, the movement of the magnetic tape 9 is accelerated in the direction of the arrow B of FIG. 1 in accordance with the level thereof. It should be noted that the reel motor drive circuit 14 is so set that the magnetic tape 9 is adapted to be given predetermined tape tension while it is transported.

Thus, it should be noted that the aforementioned control system is adapted to be operated so that the control signal $s_3$ from the operation processing circuit 11 and the angular velocity sum signal $s_4$ from the F/V converter 12 are always equal to each other and so that the direction of movement of the magnetic tape 9 varies in accordance with the polarities of the control signal $s_3$.

The control circuit of FIG. 2 detects the detection pulses $P_t$ and $P_s$ of the rotation detection signals $s_1$ and $s_2$ to obtain the control signal $s_3$ based on the operation of the expression (9) and advantageously controls the actual tape transport velocity Vp so that it is consistent with the desired tape transport velocity V determined by the expression (9) in spite of its transport direction.

Some trouble occurs in controlling the transport velocity of the magnetic tape 9 as aforementioned.

Figure 3A:
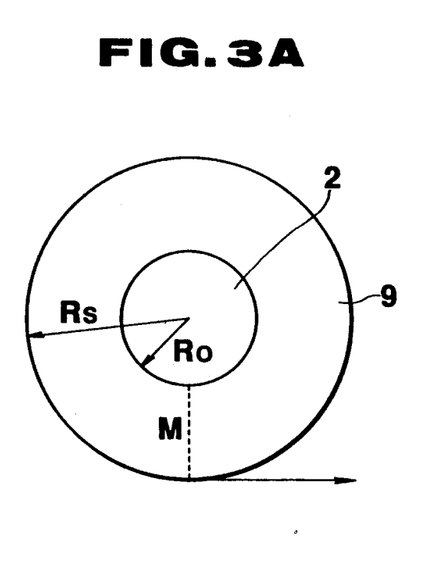
FIGS. 3A and 3B illustrate different tape winding conditions, respectively.
Figure 3B:
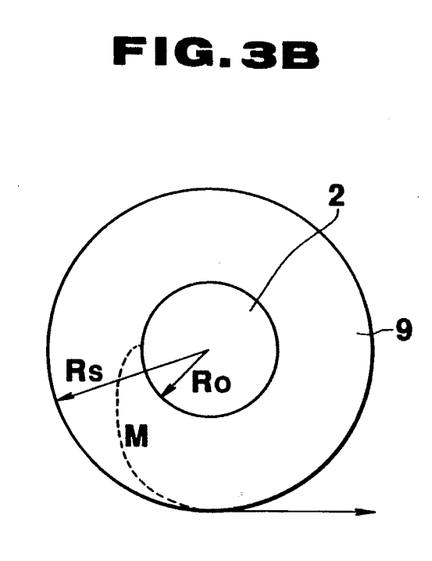

FIG. 3A shows the magnetic tape 9 wound on the C reel 2 within the cartridge 8 of FIG. 1 in the initial condition. A mark line M is provided in a winding radius direction of the magnetic tape 9. FIG. 3B shows the magnetic tape 9 wound on the C reel 2 by winding it back thereon after it is once completely wound on the winding reel 1 from the initial condition. The rotational position of the C reel 2 will be clearly offset from the original position due to the winding condition of the magnetic tape 9 in the initial condition or variation in the tape tension on winding it back. For example, the rotational position of the C reel 2 will be offset by ¼ revolution as shown in FIG. 3B.

Such an offset of the rotational position will have an adverse effect on the operation result of the expression (9) as described herein below.

The expression (9) can be rewritten as follows;

$$f(\alpha) = V(\alpha^2+1)/R_0[1/(\alpha^2+2\alpha\beta-1)+1/(2\alpha+\beta-\alpha^2\beta)] \qquad (9')$$

Figure 4A:
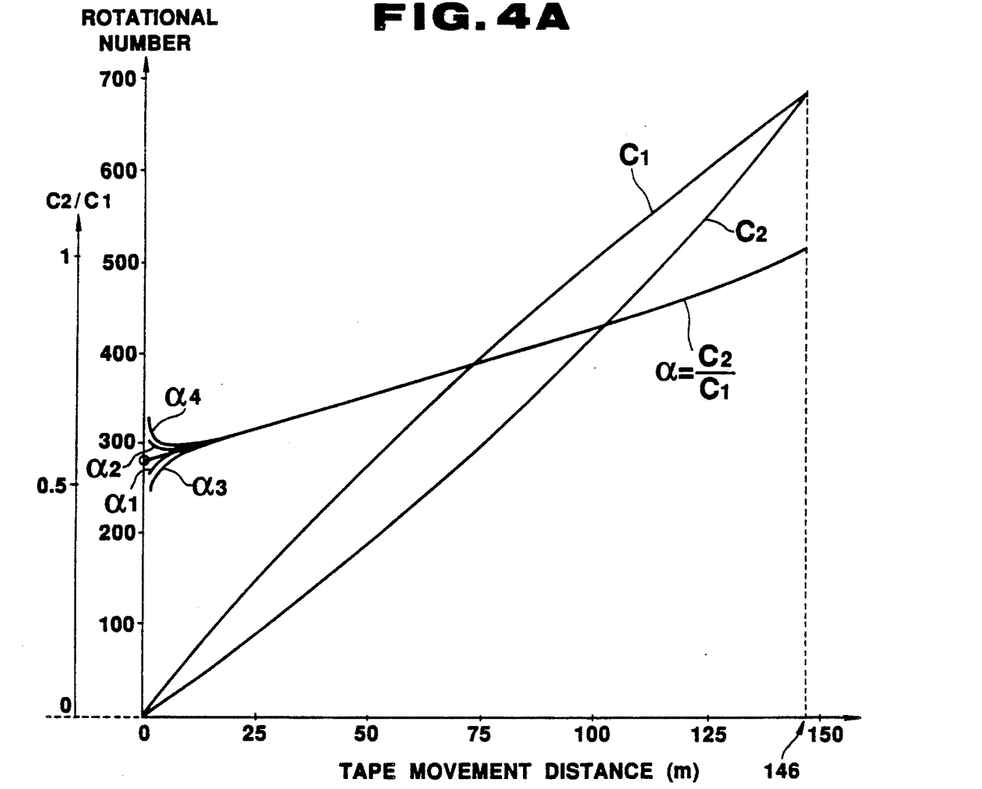
FIG. 4A and 4B illustrate variations on various values of the winding conditions of FIGS. 3A and 3B.

The rotational ratio $\alpha$ in the above expression is $C_2/C_1$ and FIG. 4A shows variations in the rotational numbers $C_1$ and $C_2$ of the reels 1 and 2 and the rotational ratio $\alpha$ thereof relative to the arbitrary tape movement distance 1. In these variations, $R_0$ is set to be 25 mm, Rs is set to be 45 mm and d is set to be 30 μm.

As noted from FIG. 4A, the rotational numbers $C_1$ and $C_2$ increase with different variation curves from the initial condition of the tape transport distance 1 being equal to 0 to the rotational number of 666.6 which correspond to the rotational number when the magnetic tape 9 is completely wound on the winding reel 1 so that the rotational numbers of the reels are equal to each other. The rotational ratio $\alpha$ is not able to be determined in the initial condition of the tape movement distance 1 being 0, but it increases as the tape movement distance 1 increases from a convergent value of $R_0/Rs$ which is 0.556 and becomes 1 when the tape movement distance 1 is 146.6 m.

It will be supposed that the winding condition of the magnetic tape 9 on the C reel 2 after the magnetic tape 9 is once completely wound on the winding reel 1 and then wound back on the C reel 2 is offset by ¼ revolution relative to the original rotational position.

Variation in the rotational ratio at that time is indicated by $\alpha_1$ in FIG. 4A. The value of $\alpha_1$ is determined as described herein below.

It is supposed that there occurs rotational offset of $\Delta\theta$ every time the rotational number $C_2$ of the C reel 2 decreases by one, which means that a turn number of the magnetic tape 9 on the C reel 2 increases by one and that there occurs no error in the rotational number $C_1$ of the winding reel 1.

Figure 4B:
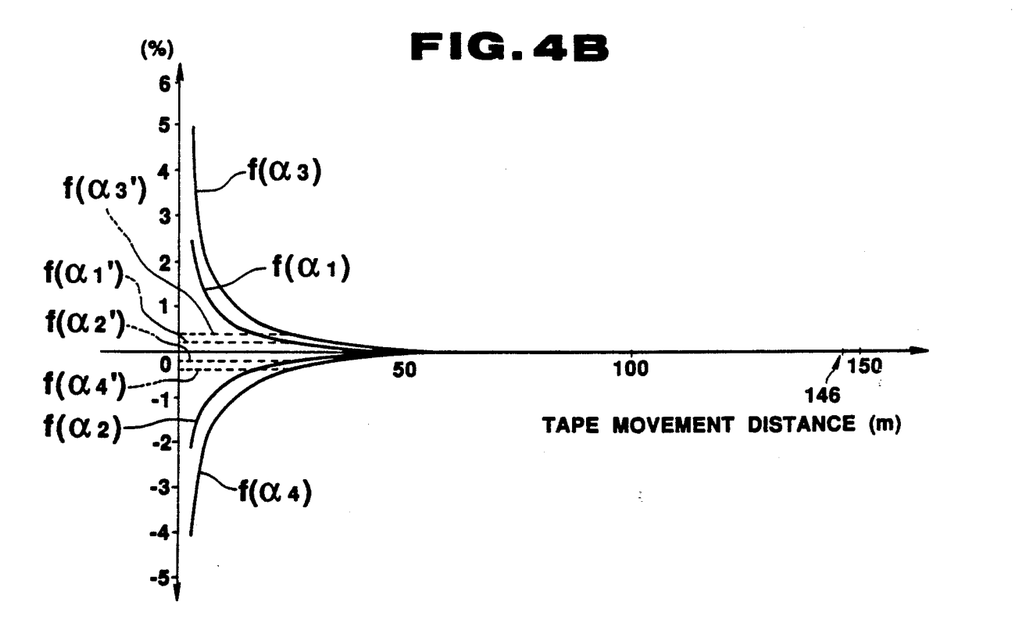

Accordingly, $\Delta\theta$ in case of FIG. 4B is expressed by $1/(4\times666.6)$. It is why there occurs no error in the rotational number $C_1$ that the rotational offset have an adverse effect on the rotational ratio when the rotational numbers $C_1$ and $C_2$ of the reels are relatively lower. When the rotational numbers $C_1$ and $C_2$ of the reels are relatively lower, the turn number of the magnetic tape 9 on the C reel 2 is higher while the turn number of the magnetic tape 9 on the winding reel 1 is lower. In this case, the error in the rotational number $C_1$ can be negligible.

Similarly, variation in the rotational ratio is indicated by $\alpha_2$ in FIG. 4A when the winding condition of the magnetic tape 9 on the C reel 2 after the magnetic tape 9 is once completely wound on the winding reel 1 and then wound back on the C reel 2 is offset by ¼ revolution relative to the original rotational position in a counterclockwise direction. Variations in the rotational ratio in case of the rotational offset in the clockwise and counterclockwise directions being ½ revolution are indicated by $\alpha_3$ and $\alpha_4$, respectively.

FIG. 4B shows differences expressed by percent between the angular velocity sum values $f(\alpha_1)$ through $f(\alpha_4)$ obtained by introducing into the expression (9) the rotational ratios $\alpha_1$ through $\alpha_4$ when there occurs the rotational offset, respectively and the angular velocity sum value $f(\alpha_0)$ obtained by introducing into the expression (9') the rotational ratio $\alpha_0$ when there occurs no rotational offset.

As noted from FIG. 4B, the differences $f(\alpha_1)$ through $f(\alpha_4)$ rapidly increase as the arbitrary tape movement distance 1 decreases in the case that the rotational position offset occurs on winding the magnetic tape 9 and then winding it back. Since the movement of the magnetic tape 9 is controlled based on the operational results of $f(\alpha_1)$ through $f(\alpha_4)$, the tape movement velocity Vp rapidly disadvantageously varies immediately before the magnetic tape 9 terminates to be wound back on the C reel 2.

This invention also has means to avoid such a drawback.

In the course of the magnetic tape 9 being wound on the winding reel 1 so that it moves in the direction of the arrow A is memorized the value of $Cf_2$ of the rotational number $C_2$ of the C reel 2 when the rotational number $C_1$ of the detected winding reel 1 reaches a relatively lower predetermined value $C_1'$ of 174, for example, which corresponds to about 30.2 m of the movement distance 1 of the magnetic tape 9.

The rotational position offset of the reels can be negligible relative to the rotational numbers $C_1'$ and $Cf_2$ because it is not so long after the magnetic tape 9 begins to move.

After the magnetic tape 9 terminates to be wound on the winding reel 1, it is wound back on the C reel 2 so that it moves in the direction of the arrow B. In the course of the magnetic tape 9 being wound back is determined the rotational number $Cr_2$ of the C reel 2 when the value $C_1'$ of the rotational number $C_1$ of the winding reel 1 becomes 174.

If the rotational position offset of the winding reel 1 can be negligible because of the turn number of the magnetic tape 9 on the winding reel 1 being relatively lower at that time, the rotational position offset $\Delta C_2$ has a value of $(Cr_2-Cf_2)$.

In order to avoid such an inconvenience, the expression (9') is determined by replacing the turn number ratio $\alpha$ in the expression (9') for $\alpha'$ which is expressed by a correction value $Cc_2$/ the rotational number $C_1$ of the winding reel 1 while the rotational number $C_1$ of the winding reel 1 meets the following expressions in the course of winding back the magnetic tape 9;

$$0 < C_1 \leq C_1' = 174$$

The correction value $Cc_2$ is obtained by the following expression;

$$Cc_2 = C_2 - \Delta C_2[(C_1'-C_1)/C_1'] \qquad (10)$$

What the operation by the expression (10) intends is to always maintain the movement of the magnetic tape 9 at a stable state by making no rapid variation in the tape transport velocity when the operation changes from the operating value of $f(\alpha)$ of the expression (9') to the operating value of $f(\alpha')$ by the correction value of $Cc_2$ at the point when $C_1$ is equal to $C_1'$ in the course of winding back the magnetic tape. Thus, it will be noted that the expression (10) is so set that the correction amount of the correction value $Cc_2$ increases in proportion to decrease in the value of $C_1$.

The operational results of $f(\alpha_1')$ through $f(\alpha_4')$ used for correction of the operational values $f(\alpha_1)$ through $f(\alpha_4)$ are indicated by dotted lines in FIG. 4B.

There is an improvement in the operational results at less than 20 m of the movement distance l of the magnetic tape 9 as noted from FIG. 4B.

Although the curves of FIGS. 4A and 4B are determined by simulation based on the respective suppositions, these were acknowledged by practical measurements.

Figure 5:
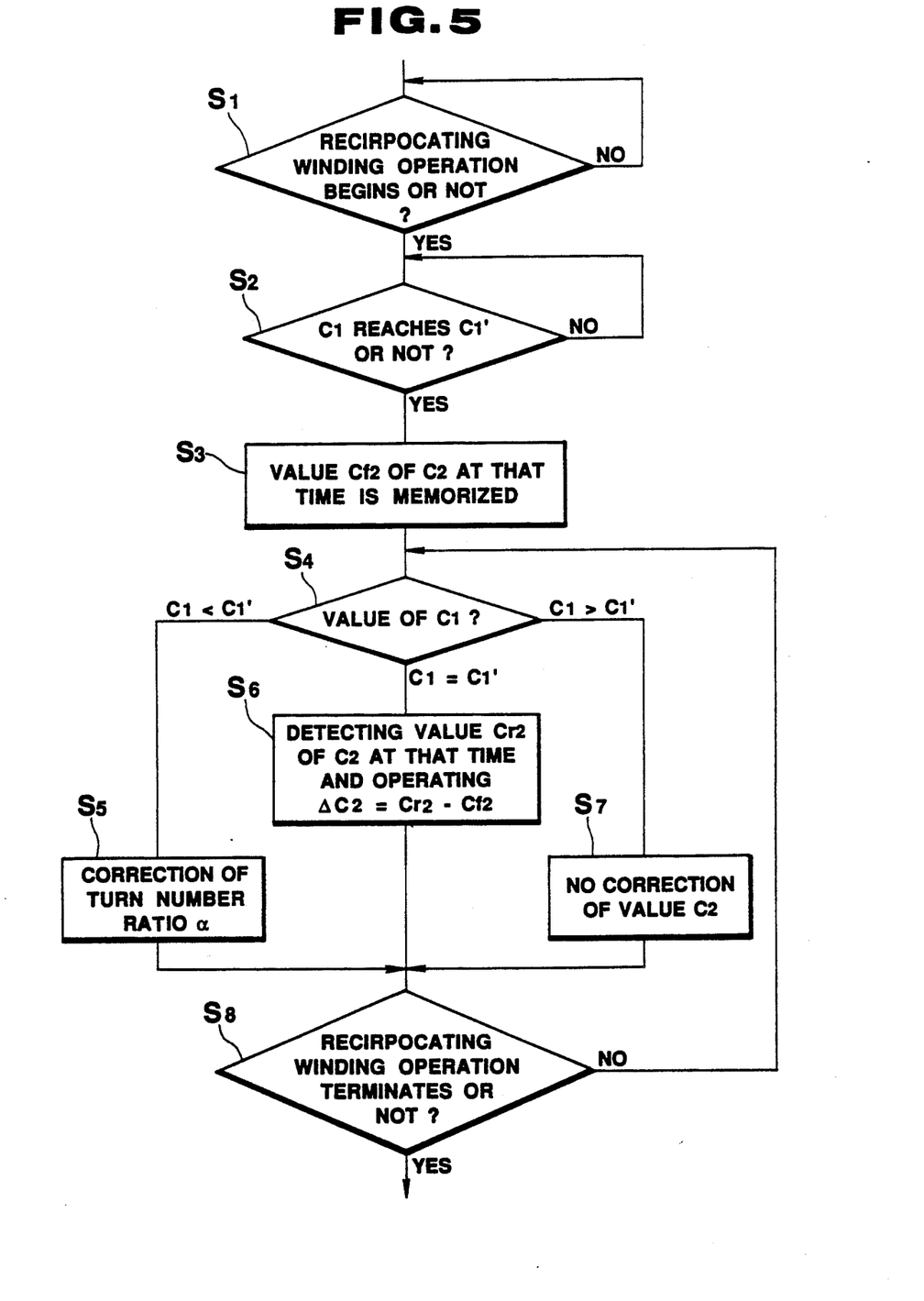
FIG. 5 is a flow chart illustrating an example of operation of the invention.

A correction process is made by the operation processing circuit 11 of FIG. 2 in accordance with flow indicated by a chart of FIG. 5.

Firstly, whether the reciprocating movement of the magnetic tape 9 beginning from the initial condition begins or not is monitored in a step S1. If the step S1 begins, whether the rotational number $C_1$ becomes the aforementioned predetermined value $C_1'$ in a step S2 is monitored.

The operation processing circuit 11 processes the detected pulses $P_t$ and $P_s$ of the rotation detection signals $s_1$ and $s_2$ occurring with the rotation of the reels 1 and 2 based on the count values $P_1$ and $P_2$ obtained by counting up or down in accordance with its rotational direction. Between the count values $P_1$ and $P_2$ and the rotational numbers $C_1$ and $C_2$ lie distinct relations of $C_1=P_1/n$ and $C_2=P_2/n$. Accordingly, the rotational numbers $C_1$ and $C_2$ are used for explanation of the flow chart of FIG. 5 for simpler explanation and also the values $C_1'$, $Cf_2$, $Cr_2$, $\Delta C_2$ and $Cc_2$ set on those are used for explanation thereof.

If, in the step S2, it is judged that the rotational number $C_1$ becomes the predetermined value $C_1'$, the value $Cf_2$ of the rotational number $C_2$ is memorized in a step S3.

During this, the operation processing circuit 11 operates $f(\alpha)$ and continues to output the control signal $s_3$ of the voltage value $v_3=k_1.f(\alpha)$ based on the operation.

Thereafter, in a step S4, the rotational number $C_1$ of the winding reel 1 is monitored. During a period of $C_1 > C_1'$, steps S4, S7 and S8 are repeated until the termination of the reciprocating winding operation is detected in the step S8. Thus, the voltage value $v_3$ of the control signal $s_3$ during the period of $C_1 > C_1'$ continues to be $k_1.f(\alpha)$.

If $C_1$ is equal to $C_1'$, then the flow is transferred to a step S6 in which $\Delta C_2$ is determined by detecting the value $Cr_2$ of the rotational number $C_2$. The flow is returned to the step S4 through the step S8 in which the termination of the reciprocating winding operation is detected.

If $C_1 < C_1'$ is established, then the flow is transferred to a step S5. In this step S5, the correction value $Cc_2$ is determined by the expression (10) and $f(\alpha')$ is determined by the corrected turn number ratio $\alpha'$ based on this operation. Thus, at that time, the operation processing circuit 11 switches the voltage value $v_3$ into the voltage value $k_1.f(\alpha')$ corrected from $k_1.f(\alpha)$. Thereafter, the corrected voltage value $k_1.f(\alpha')$ continues to be output until the termination of the reciprocating winding operation is detected in the step S8.

A time when the reciprocating winding operation detected in the step S8 terminates may correspond to a time when the rotational number $C_1$ becomes 0 or nearly 0 or to a time when an operator operates operating means so as to stop the movement of the magnetic tape 9.

Although, in the illustrated embodiment, the reel motors are controlled based on a comparison of the operated angular velocity $(\omega_1+\omega_2)$ with the actual angular velocity $(\omega p_1+\omega p_2)$, they may be controlled based on a comparison of $\omega p_1$ with $\omega_1$ or a comparison of $\omega p_2$ with $\omega_2$. Alternatively, only a rotation of the reel motor rotating one of the reels 1 on which the magnetic tape 9 is wound is controlled and the other reel has mechanical brake means provided thereon so that the tape tension is applied to the magnetic tape 9.

Although, in the illustrated embodiment, $\Delta C_2$ is detected relative to the rotational number $C_1$ of the winding reel 1, it may be detected as described herein below.

In the course of winding the magnetic tape 9, the value $Cf_2$ of the rotational number $C_2$ of the C reel 2 when the rotational number $C_1$ of the winding reel 1 reaches a predetermined value $C_1'$ is memorized. In the course of winding it back, the rotational number $C_1$ of the winding reel 1 when the rotational number $C_2$ of the C reel 2 reaches the memorized value $Cf_2$ is detected as a value of $Cr_1$. A difference $\Delta C_2'$ between the values $C_1'$ and $Cr_1$ is substantially equal to $\Delta C_2$. Thus, it will be noted that the expression (10) can be deformed into the following expression which can be used for correction;

$$Cc_2' = C_2 - \Delta C_2'[(Cr_1 - C_1)/Cr_1] \quad (10')$$

Furthermore, in the course of winding the magnetic tape 9, the value $Cf_1$ of the rotational number $C_1$ of the winding reel 1 when the rotational number $C_2$ of the C reel 2 reaches a predetermined value $C_2'$ corresponding to the predetermined value $C_1'$ is memorized. In the course of winding it back, the rotational number $C_1$ of the winding reel 1 when the rotational number $C_2$ of the C reel 2 again reaches the predetermined value $C_2'$ is detected as a value of $Cr_1'$. A difference $\Delta C_2''$ between the values $Cf_1$ and $Cr_1'$ is substantially equal to $\Delta C_2$. Thus, it will be noted that the expression (10) can be deformed into the following expression which can be also used for correction;

$$Cc_2'' = C_2 - \Delta C_2''[(Cr_1' - C_1)/Cr_1'] \quad (10'')$$

It will be noted that the same result can be obtained by subtracting the offset value from the determined values of $\Delta C_2$, $\Delta C_2'$ and $\Delta C_2''$ when they are detected while the detecting points are slightly offset in the course of winding it back.

Although, in the illustrated embodiment, $\Delta C_2$, $\Delta C_2'$ and $\Delta C_2''$ are introduced into the expressions (10), (10') and (10''), respectively, so as to correct the angular velocity, it will be understood that they are by way of example, and that the invention is never defined thereto.

It should be understood that various changes and modifications may be made without departing from the spirit and scope of the invention, which is intended to be defined only by the appended claims.

What is claimed is:

1. A method of controlling reel drive so that a magnetic tape is transported from one reel of first and second reels to the other between them at predetermined transport velocity, comprising the steps of:

determining a ratio of a second rotational number $C_2$ indicating a variation in a turn number on said second reel after said magnetic tape begins to be transported to a first rotational number $C_1$ indicating a variation in a turn number on said first reel after said magnetic tape begins to be transported to be $\alpha$;

determining a ratio of a winding radius of said second reel to that of said first reel to be $\beta$ at the point when said magnetic tape begins to be transported;

forming a control signal based on the following equation:

$$R_1/R_0 = (\alpha^2 + 2\alpha\beta - 1)/(\alpha^2 + 1) \qquad (1)$$

wherein $R_1$ equals a winding radius of said first reel after the magnetic tape begins to be transported and $R_0$ equals a winding radius of said first reel at the point when the magnetic tape begins to be transported;

and comparing said control signal with a rotational angular velocity information of said first reel actually detected whereby a rotation of at least one of said first and second reels is controlled.

2. A method of controlling reel drive as set forth in claim 1, and wherein said winding radius Rs of said second reel is a predetermined constant.

3. A method of controlling reel drive as set forth in claim 1, and wherein said winding radius Rs of said second reel is determined by a ratio of $R_0$ to $\alpha_1$ which is a ratio of said second rotational number to said first rotational number when said magnetic tape is transported corresponding to predetermined revolution of said second reel.

4. A method of controlling reel drive so that a magnetic tape is transported from one reel of first and second reels to the other between them at predetermined transport velocity, comprising the steps of:

determining a ratio of a second rotational number $C_2$ indicating variation in a turn number on said second reel after said magnetic tape begins to be transported to a first rotational number $C_1$ indicating variation in a turn number on said first reel after said magnetic tape begins to be transported to be $\alpha$;

determining a ratio of a winding radius of said second reel to that of said first reel to be $\beta$ at the point when said magnetic tape begins to be transported;

forming a control signal based on the following equation:

$$R_1/R_0 = (\alpha^2 + 2\alpha\beta - 1)/(\alpha^2 + 1) \qquad (1)$$

wherein $R_1$ equals a winding radius of said first reel after the magnetic tape begins to be transported and $R_0$ equals a winding radius of said first reel at the point when the magnetic tape begins to be transported;

comparing said control signal with a rotational angular velocity information of said first reel actually detected whereby a rotation of at least one of said first and second reels is controlled;

memorizing one of said first and second rotational numbers $C_1$ and $C_2$ when the other rotational number reaches a predetermined rotational number in the case of said magnetic tape being transported in a direction in which both of said first and second rotational numbers $C_1$ and $C_2$ increase;

and correcting said ratio $\alpha$ based on said memorized rotational information in the case of said magnetic tape being transported in a direction in which both of said first and second rotational numbers $C_1$ and $C_2$ decrease.

5. A method of controlling reel drive as set forth in claim 4, and wherein said winding radius Rs of said second reel is a predetermined constant.

6. A method of controlling reel drive as set forth in claim 4, and wherein said winding radius Rs of said second reel is determined by a ratio of $R_0$ to $\alpha_1$ which is a ratio of said second rotational number to said first rotational number when said magnetic tape is transported corresponding to predetermined revolution of said second reel.

7. A method of controlling a reel drive as set forth in claim 4, wherein a value $\alpha_1$, obtained by correcting said ratio $\alpha$ has a correction value $Cc_2$ by which said second rotational number $C_2$ is to be replaced, said correction value being determined by the following expression;

$$Cc_2 = C_2 - \Delta C_2(C_1' - C_1)/C_1'$$

in which $C_1'$ is a relatively lower predetermined value and $\Delta C_2$ is a difference between the respective values of said $C_2$ when said $C_1$ reaches $C_1'$ in the respective courses where said magnetic tape is transported in the respective directions.

8. A method of controlling reel drive so that a magnetic tape is transported from one reel of first and second reels to the other between them at predetermined transport velocity, comprising the steps of:

determining a ratio of a second rotational member $C_2$ indicating variation in a turn number on said second reel after said magnetic tape begins to be transported to a first rotational number $C_1$ indicating variation in a turn number on said first reel after said magnetic tape begins to be transported to be $\alpha$;

determining a ratio of a winding radius of said second reel to that of said first reel to be $\beta$ at the point when said magnetic tape begins to be transported;

forming a control signal based on the following equation:

$$R_2/R_0 = (2\alpha + \beta - \alpha^2\beta)/(\alpha^2 + 1) \qquad (2)$$

wherein $R_2$ equals a winding radius of said second reel after the magnetic tape begins to be transported and $R_0$ equals a winding radius of said first reel at the point when the magnetic tape begins to be transported;

and comparing said control signal with a rotational angular velocity information of said second reel actually detected whereby a rotation of at least one of said first and second reels is controlled.

9. A method of controlling reel drive so that a magnetic tape is transported from one reel of first and second reels to the other between them at predetermined transport velocity, comprising the steps of:

determining a ratio of a second rotational member $C_2$ indicating variation in a turn number on said second reel after said magnetic tape begins to be transported to a first rotational number $C_1$ indicating variation in a turn number on said first reel after said magnetic tape begins to be transported to be $\alpha$;

determining a ratio of a winding radius of said second reel to that of said first reel to be $\beta$ at the point when said magnetic tape begins to be transported;

forming a control signal based on the following equations:

$$R_1/R_0 = (\alpha^2 + 2\alpha\beta - 1)/(\alpha^2 + 1) \qquad (1)$$

$$R_2/R_0 = (2\alpha + \beta - \alpha^2\beta)/(\alpha^2 + 1) \qquad (2)$$

wherein $R_1$ equals a winding radius of said first reel after the magnetic tape begins to be transported, $R_2$ equals a winding radius of said second reel after the magnetic tape begins to be transported and $R_0$ equals a winding radius of said first reel at the point when the magnetic tape begins to be transported;

and comparing said control signal with a rotational angular velocity information of said first and second reels actually detected whereby a rotation of at least one of said first and second reels is controlled.

10. A method of controlling reel drive so that a magnetic tape is transported from one reel of first and second reels to the other between them at predetermined transport velocity, comprising the steps of:

determining a ratio of a second rotational number $C_2$ indicating variation in a turn number on said second reel after said magnetic tape begins to be transported to a first rotational number $C_1$ indicating variation in a turn number on said first reel after said magnetic tape begins to be transported to be $\alpha$;

determining a ratio of a winding radius of said second reel to that of said first reel to be $\beta$ at the point when said magnetic tape begins to be transported;

forming a control signal based on the following equation:

$$R_2/R_0 = (2\alpha + \beta - \alpha^2\beta)/(\alpha^2 + 1) \qquad (2)$$

wherein $R_2$ equals a winding radius of said second reel after the magnetic tape begins to be transported and $R_0$ equals a winding radius of said first reel at the point when the magnetic tape begins to be transported;

comparing said control signal with a rotational angular velocity information of said second reel actually detected whereby a rotation of at least one of said first and second reels is controlled;

memorizing one of said first and second rotational numbers $C_1$ and $C_2$ when the other rotational number reaches a predetermined rotational number in the case of said magnetic tape being transported in a direction in which both of said first and second rotational numbers $C_1$ and $C_2$ increase;

and correcting said ratio $\alpha$ based on said memorized rotational information in the case of said magnetic tape being transported in a direction in which both of said first and second rotational numbers $C_1$ and $C_2$ decrease.

11. A method of controlling reel drive so that a magnetic tape is transported from one reel of first and second reels to the other between them at predetermined transport velocity, comprising the steps of:

determining a ratio of a second rotational number $C_2$ indicating variation in a turn number on said second reel after said magnetic tape begins to be transported to a first rotational number $C_1$ indicating variation in a turn number on said first reel after said magnetic tape begins to be transported to be $\alpha$;

determining a ratio of a winding radius of said second reel to that of said first reel to be $\beta$ at the point when said magnetic tape begins to be transported;

forming a control signal based on the following equations:

$$R_1/R_0 = (\alpha^2 + 2\alpha\beta - 1)/(\alpha^2 + 1) \qquad (1)$$

$$R_2/R_0 = (2\alpha + \beta - \alpha^2\beta)/(\alpha^2 + 1) \qquad (2)$$

wherein $R_1$ equals a winding radius of said first reel after the magnetic tape begins to be transported, $R_2$ equals a winding radius of said second reel after the magnetic tape begins to be transported and $R_0$ equals a winding radius of said first reel at the point when the magnetic tape begins to be transported;

comparing said control signal with a rotational angular velocity information of said first and second reels actually detected whereby a rotation of at least one of said first and second reels is controlled;

memorizing one of said first and second rotational numbers $C_1$ and $C_2$ when the other rotational number reaches a predetermined rotational number in the case of said magnetic tape being transported in a direction in which both of said first and second rotational numbers $C_1$ and $C_2$ increase;

and correcting said ratio $\alpha$ based on said memorized rotational information in the case of said magnetic tape being transported in a direction in which both of said first and second rotational numbers $C_1$ and $C_2$ decrease.

* * * * *